Patented Dec. 26, 1922.

1,439,780

UNITED STATES PATENT OFFICE.

GLEN LENARDO WILLIAMS, OF DETROIT, MICHIGAN.

RUST REMOVER.

No Drawing. Application filed January 23, 1922. Serial No. 531,094.

*To all whom it may concern:*

Be it known that I, GLEN LENARDO WILLIAMS, a citizen of the United States of America, residing in the city of Detroit, in the county of Wayne, in the State of Michigan, have invented certain new and useful Improvements in a Rust Remover, a liquid, of which the following is a specification.

In the rust remover involving my invention, mineral or vegetable acids are mixed with metallic salts in a medium consisting of a colloidal carbohydrate material. The term "carbohydrate" is to be taken as including the sugars, starches and celluloses. A typical substance is one of the starches, heated in water until the small cells or granules swell to form a gelatinous paste.

This gelatinization occurs at different temperatures with different starches. The temperature of gelatinization for potato starch, for example, is 65° C.; for maize starch or cornstarch, 75° C.; for barley, malt, or rice starches, 80° C.; while green malt or oat starch gelatinizes at 85° C.

Generally, when starch is heated with metallic salts, as for example, zinc sulphate, under pressure, the starch molecule breaks down into dextrines which are soluble in cold water. When acids are added before heating, the colloidal carbohydrate absorbs the acid and the conversion into soluble sugars or dextrine occurs less readily.

When starch is heated with dilute acids, a hydrolization may occur resulting in the production of soluble sugars. When acids and metallic salts are both present, the hydrolyzation of the starch molecule is prevented so that no soluble sugars are formed, or small amounts only.

Salts of sodium, potassium, lithium or calcium, are preferred, and the acids may be either mineral or vegetable acids. Suitable acids are hydrochloric, sulphuric, nitric, hydrofluoric, phosphoric, acetic, formic, and tartaric acids.

The carbohydrate materials are mixed with water to form a paste. A solution of metallic salts is placed in an autoclave and the carbohydrate paste added with constant stirring. Heat is supplied to gelatinize the carbohydrates to form a colloidal suspension, and the acids and alcohols are then added. The gelatinization of the carbohydrates is facilitated by the presence of metallic salts electro-positive to iron, as for example, zinc sulphate.

A much higher percentage of acid is used than would be required for hydrolyzation of the carbohydrate.

The alcohols may comprise methyl, ethyl, amyl or butyl alcohols or glycerine.

The following formulæ will illustrate the approximate proportions of the raw materials for four different strength of mixtures.

1.

13 gals. water.
5 lbs. zinc salts.
20 lbs. carbohydrates.
2 gals. alcohols.
35 lbs. sodium acid salts.
120 lbs. hydrochloric acid.

2.

14 gals. water.
5 lbs. metallic acid salts.
36 lbs. carbohydrates.
9 gals. alcohols.
54 lbs. sodium acid salts.
160 lbs. acids.

3.

13 gals. water.
10 lbs. metal salts.
30 lbs. carbohydrates.
5 gals alcohols or glycerines.
90 lbs. sodium acid salts.
260 lbs. acids, mineral or veg.

4.

10 gals. water.
12 lbs. metal salts.
35 lbs. carbohydrates.
10 gals. alcohol.
100 lbs. alkali metal salts.
270 lbs. acids.

The mixtures may be varied in many ways for different uses. One or more acids may be used in the same mixture with one or more alcohols, one or more metallic salts and one or more carbohydrates.

In every instance, however, the acid held in the colloidal suspension, when brought into contact with the iron rust, consisting of iron oxides or hydroxides will react upon the rust, especially in the presence of salts of metals electropositive to iron. The action of the present rust-removing compound is probably a complex one, in which catalytic action may occur, but the final result is the formation of soluble iron salts or salt aggregates capable of being washed off or rubbed off, leaving a surface free from oxide incrustations.

The colloidal carbohydrates not only serve as a vehicle for the acids, and salt solutions, but in conjunction with the alcohol, aid in the removal of adhering greases, oils, or other foreign matter, and the final film left when the preparation is rubbed off, acts as a protective coating. The colloidal suspension also prevents the acids from causing injury to the hands while the liquid is being used.

The salts of sodium or other alkali metals referred to in the formulæ when added to an acid solution aid in preventing injurious action of the acid on the skin.

I claim:

1. A liquid of a white opaque appearance consisting of carbohydrate material, gelatinized and containing acid and a salt of a metal electropositive to iron.

2. A rust-remover comprising a colloidal suspension of carbohydrate material containing acid and a salt of a metal electro-positive to iron.

3. A rust-remover comprising water, and alcohol, an acid, carbohydrate material, and a salt of a metal electropositive to iron.

4. A rust remover comprising a colloidal carbohydrate, an alcohol, a plurality of acids, and a salt of a metal electro-positive to iron.

5. A rust remover comprising colloidal carbohydrate material gelatinized in the presence of metallic salts electro-positive to iron, in combination with an acid and a metal salt weakening the action of the acid on the skin.

In testimony hereof I affix my signature.

GLEN LENARDO WILLIAMS.

Witness:
    LEWIS E. FLANDERS.